(12) United States Patent
Maamari et al.

(10) Patent No.: US 12,452,930 B2
(45) Date of Patent: Oct. 21, 2025

(54) DELAY STATUS AND/OR DELAY STATISTICS REPORTING TO MAINTAIN CONTINUITY DURING HANDOVER

(71) Applicant: QUALCOMM Incorporated, San Diego, CA (US)

(72) Inventors: Diana Maamari, San Diego, CA (US); Linhai He, San Diego, CA (US); Aziz Gholmieh, Del Mar, CA (US); Mickael Mondet, Louannec (FR)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/308,392

(22) Filed: Apr. 27, 2023

(65) Prior Publication Data
US 2024/0365388 A1  Oct. 31, 2024

(51) Int. Cl.
*H04W 74/0833* (2024.01)
*H04W 74/04* (2009.01)
*H04W 36/08* (2009.01)

(52) U.S. Cl.
CPC ....... *H04W 74/0833* (2013.01); *H04W 74/04* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 2007/0162536 A1* | 7/2007 | Ostrovsky | H04L 12/2814 709/200 |
| 2012/0269062 A1* | 10/2012 | Cho | H04L 47/263 370/230 |
| 2013/0077659 A1* | 3/2013 | Okuda | H04J 3/0667 375/219 |
| 2023/0022414 A1* | 1/2023 | Kim | H04L 1/1896 |
| 2024/0114380 A1* | 4/2024 | Cheng | H04L 47/801 |
| 2024/0196313 A1* | 6/2024 | Ryu | H04W 48/16 |
| 2024/0251285 A1* | 7/2024 | He | H04L 1/0018 |
| 2024/0284444 A1* | 8/2024 | Elshafie | H04W 72/541 |
| 2024/0306033 A1* | 9/2024 | Elshafie | H04W 28/0278 |
| 2024/0365388 A1* | 10/2024 | Maamari | H04W 72/542 |
| 2025/0193722 A1* | 6/2025 | Tsai | H04W 24/10 |

* cited by examiner

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a target network node may receive, from a source network node, delay status information associated with a user equipment (UE) served by the source network node, wherein the delay status information is associated with one or more logical channels (LCHs). The target network node may receive, from the UE during a random access channel (RACH) procedure, one or more messages that include one or more delay status reports associated with the one or more LCHs. The target network node may transmit, to the UE during a handover of the UE from the source network node, one or more messages indicating one or more uplink scheduling parameters for the one or more LCHs based on the delay status information and the one or more delay status reports associated with the one or more LCHs.

30 Claims, 8 Drawing Sheets

DELAY STATUS AND/OR DELAY STATISTICS REPORTING TO MAINTAIN CONTINUITY DURING HANDOVER

FIELD OF THE DISCLOSURE

Aspects of the present disclosure generally relate to wireless communication and to techniques and apparatuses associated with delay status and/or delay statistics reporting to maintain continuity during handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a target network node for wireless communication. The target network node may include a memory and one or more processors coupled to the memory. The one or more processors may be configured to receive, from a source network node, delay status information associated with a user equipment (UE) served by the source network node, wherein the delay status information is associated with one or more logical channels (LCHs). The one or more processors may be configured to receive, from the UE during a random access channel (RACH) procedure, one or more messages that include one or more delay status reports associated with the one or more LCHs. The one or more processors may be configured to transmit, to the UE during a handover of the UE from the source network node, one or more messages indicating one or more uplink scheduling parameters for the one or more LCHs based on the delay status information and the one or more delay status reports associated with the one or more LCHs.

Some aspects described herein relate to a method of wireless communication performed by a target network node. The method may include receiving, from a source network node, delay status information associated with a UE served by the source network node, wherein the delay status information is associated with one or more LCHs. The method may include receiving, from the UE during a RACH procedure, one or more messages that include one or more delay status reports associated with the one or more LCHs. The method may include transmitting, to the UE during a handover of the UE from the source network node, one or more messages indicating one or more uplink scheduling parameters for the one or more LCHs based on the delay status information and the one or more delay status reports associated with the one or more LCHs.

Some aspects described herein relate to a non-transitory computer-readable medium that stores a set of instructions for wireless communication by a target network node. The set of instructions, when executed by one or more processors of the target network node, may cause the target network node to receive, from a source network node, delay status information associated with a UE served by the source network node, wherein the delay status information is associated with one or more LCHs. The set of instructions, when executed by one or more processors of the target network node, may cause the target network node to receive, from the UE during a RACH procedure, one or more messages that include one or more delay status reports associated with the one or more LCHs. The set of instructions, when executed by one or more processors of the target network node, may cause the target network node to transmit, to the UE during a handover of the UE from the source network node, one or more messages indicating one or more uplink scheduling parameters for the one or more LCHs based on the delay status information and the one or more delay status reports associated with the one or more LCHs.

Some aspects described herein relate to an apparatus for wireless communication. The apparatus may include means for receiving, from a source network node, delay status information associated with a UE served by the source network node, wherein the delay status information is associated with one or more LCHs. The apparatus may include means for receiving, from the UE during a RACH procedure, one or more messages that include one or more delay status reports associated with the one or more LCHs. The apparatus may include means for transmitting, to the UE during a handover of the UE from the source network node, one or more messages indicating one or more uplink scheduling parameters for the one or more LCHs based on the delay status information and the one or more delay status reports associated with the one or more LCHs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
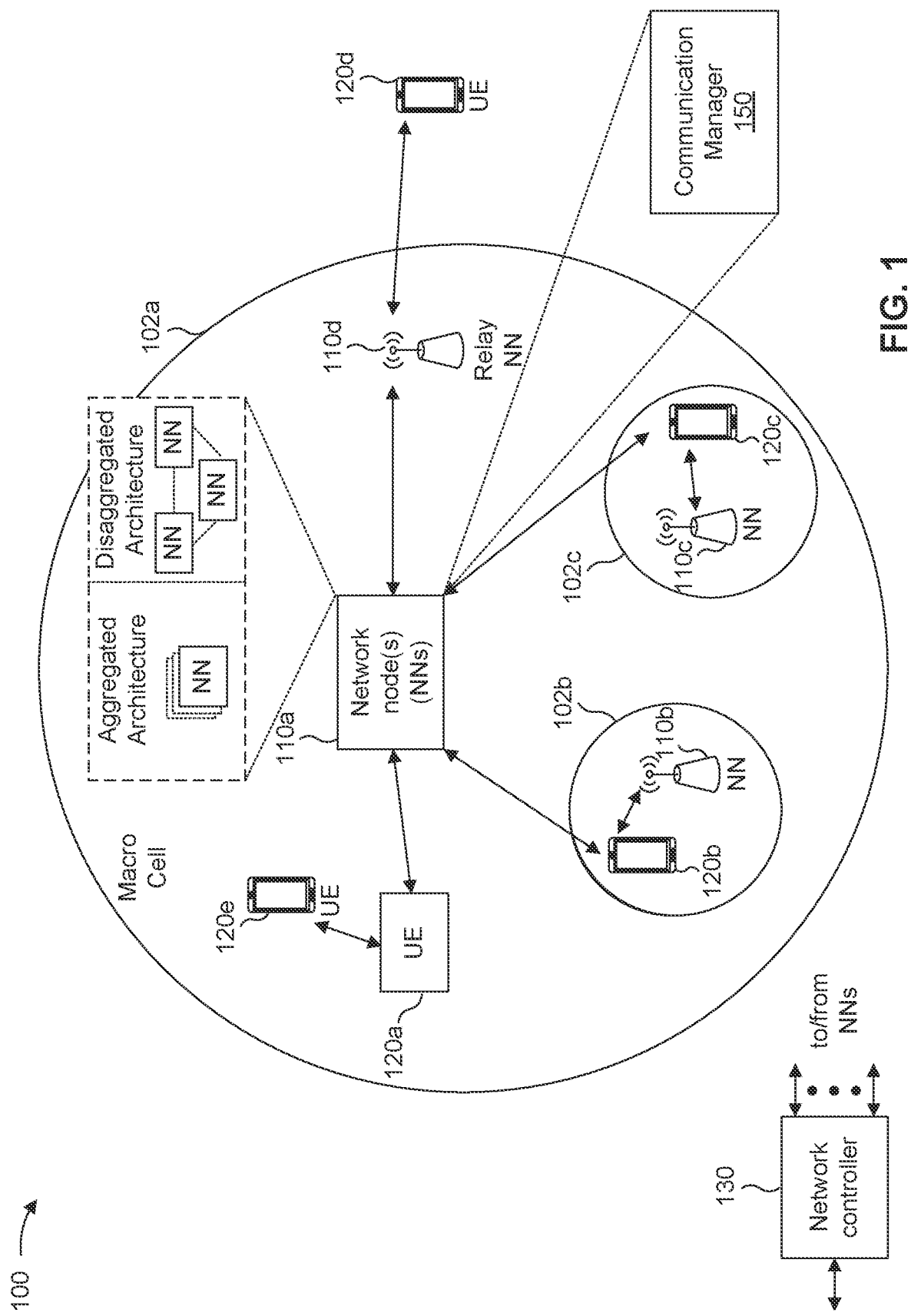
FIG. 1 is a diagram illustrating an example of a wireless network, in accordance with the present disclosure.

There are existing and ongoing efforts to configure cellular networks to support extended reality (XR) traffic, which is an umbrella term that covers immersive technologies such as virtual reality (VR), augmented reality (AR), mixed reality (MR), and levels of virtuality interpolated among VR, AR, and MR. For example, VR is a rendered version of an audiovisual scene, where the rendering is designed to mimic the visual and audio sensory stimuli of the real world as naturally as possible to an observer or a user as they move within the limits defined by the VR application. VR typically requires a user to wear a head mounted display (HMD) to completely replace a field of view with a simulated visual component, and to use headphones, a speaker, and/or another suitable audio device to hear the accompanying audio. Head and motion tracking of the user is usually also needed in VR applications to allow the simulated visual and audio components to be updated in order to ensure that, from the perspective of the user, items and sound sources remain consistent with movements of the user. In AR applications, a user is generally provided with additional information or artificially generated items or content that are overlaid upon a current environment. The additional information or content is usually visual and/or audible and observation of the current environment may be direct, with no intermediate sensing, processing and rendering, or indirect, where perception of the environment may be relayed via sensors and enhanced or processed. MR is an advanced form of AR where some virtual elements are inserted into a physical scene to provide an illusion that the elements are part of the real scene.

XR is expected to improve productivity and convenience for consumers, enterprises, and public institutions in various application areas such as entertainment, training, education, remote support, remote control, communications, and/or virtual meetings, among other examples. XR can be used in many industry segments, including health care, real estate, shopping, transportation, manufacturing, and/or other industry segments. VR is already used for gaming both at home and at dedicated venues, for virtual tours in the context of real estate, for education and training purposes, and for remote participation at live events such as concerts and sports. Furthermore, AR and MR use cases have significant potential. For example, whereas VR applications rely on HMDs that separate users from physical surroundings and restrict mobility, AR and MR applications allow users to be present in reality and move freely even when using HMDs. Many smartphone users have already experienced basic forms of AR, through games that involve searching for virtual objects in real-world environments and apps that enable shoppers to visualize new furniture in their homes before making a purchase. Furthermore, AR technology may be used with an HMD to free a user's hands, and thereby increase worker efficiency by providing an ability to overlay information on the real world while simultaneously having hands available.

However, configuring a wireless network to support the latency requirements, quality of experience (QoE) requirements, high data rates, and/or other characteristics associated with XR traffic presents various challenges. For example, in order to schedule delay-sensitive traffic (e.g., XR traffic) more efficiently, a network node may configure a UE to measure and report downlink and/or uplink delay statistics for one or more data radio bearers (DRBs) used to transport the delay-sensitive traffic. In this way, rather than scheduling the one or more DRBs using a fixed delay budget, which can result in conservative deadlines, the network node may configure the UE to provide feedback on delay statistics (e.g., an average delay, a standard deviation, or the like) such that the network node can adapt the delay budgets that are configured and/or applied to compensate for scheduling inefficiencies. For example, on a downlink, the UE can be configured to measure the amount of delay budget that is remaining before a delivery deadline (e.g., a residual delay budget) for a protocol data unit (PDU) or a PDU set and to report the residual delay budget to the network node. The network node can then use the residual delay budget reported by the UE to adjust the delay budget that the network node applies to downlink traffic (e.g., the network node may increase the delay budget applied to downlink traffic if the residual delay budget is large). Additionally, or alternatively, on an uplink, the UE can be configured to measure and report the amount of delay that a PDU or a PDU set experienced when successfully received by the network node (e.g., upon reception of a positive radio link control (RLC) status report). The network node can then use the reported delay statistics to estimate the residual delay budget for the rest of the connection (e.g., by subtracting the delay reported by the UE from an end-to-end delay budget that is provisioned for a flow).

However, when a UE changes cells, such as moving from a source cell provided by a source network node to a target cell provided by a target network node during a handover, the source network node typically ceases any uplink and/or downlink transmission for the UE after the source network node sends a sequence number (SN) status transfer message to the target network node. In a typical handover procedure, the target network node does not have access to any information that indicates the delay status or delay statistics that the UE is experiencing. Consequently, uplink scheduling needs to be deferred until after the handover is complete, which increases the delay associated with uplink traffic, which is particularly troublesome for XR services or other traffic associated with delay-sensitive applications and/or a tight delay budget. Accordingly, some aspects described herein relate to techniques to inform a target network node about the delay status or delay statistics experienced by a UE being handed over to the target network node such that the target network node can start to determine uplink scheduling parameters (e.g., an uplink scheduling priority and/or an uplink grant size) for the UE based on the reported delay status or delay statistics. For example, in some aspects, the source network node may provide delay status information associated with the UE to the target network node in the SN status transfer message or a separate message during a handover of the UE. Additionally, or alternatively, the UE may provide one or more delay status reports to the target network node in an uplink message associated with a random access channel (RACH) procedure. In this way, during a dual active protocol stack (DAPS) handover, where an interruption time is close to zero (0) milliseconds (ms), informing the target network node of the delay status associated with the UE allows the target network node to schedule the UE as soon as possible to satisfy delay requirements for XR or other delay-sensitive traffic. Additionally, or alternatively, in a non-DAPS handover (e.g., where the latency requirements for XR or other delay-sensitive traffic is usually much smaller than the time required by the mobility procedure), the statistical delay reporting may provide long-term statistics that are useful for making scheduling decisions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may receive, from a source network node, delay status information associated with a UE 120 served by the source network node, wherein the delay status information is associated with one or more logical channels (LCHs); receive, from the UE 120 during a RACH procedure, one or more messages that include one or more delay status reports associated with the one or more LCHs; and transmit, to the UE 120 during a handover of the UE 120 from the source network node, one or more messages indicating one or more uplink scheduling parameters for the one or more LCHs based on the delay status information and the one or more delay status reports associated with the one or more LCHs. Additionally, or alternatively, the communication manager 150 may perform one or more other operations described herein.

As indicated above, FIG. 1 is provided as an example. Other examples may differ from what is described with regard to FIG. 1.

Figure 2:
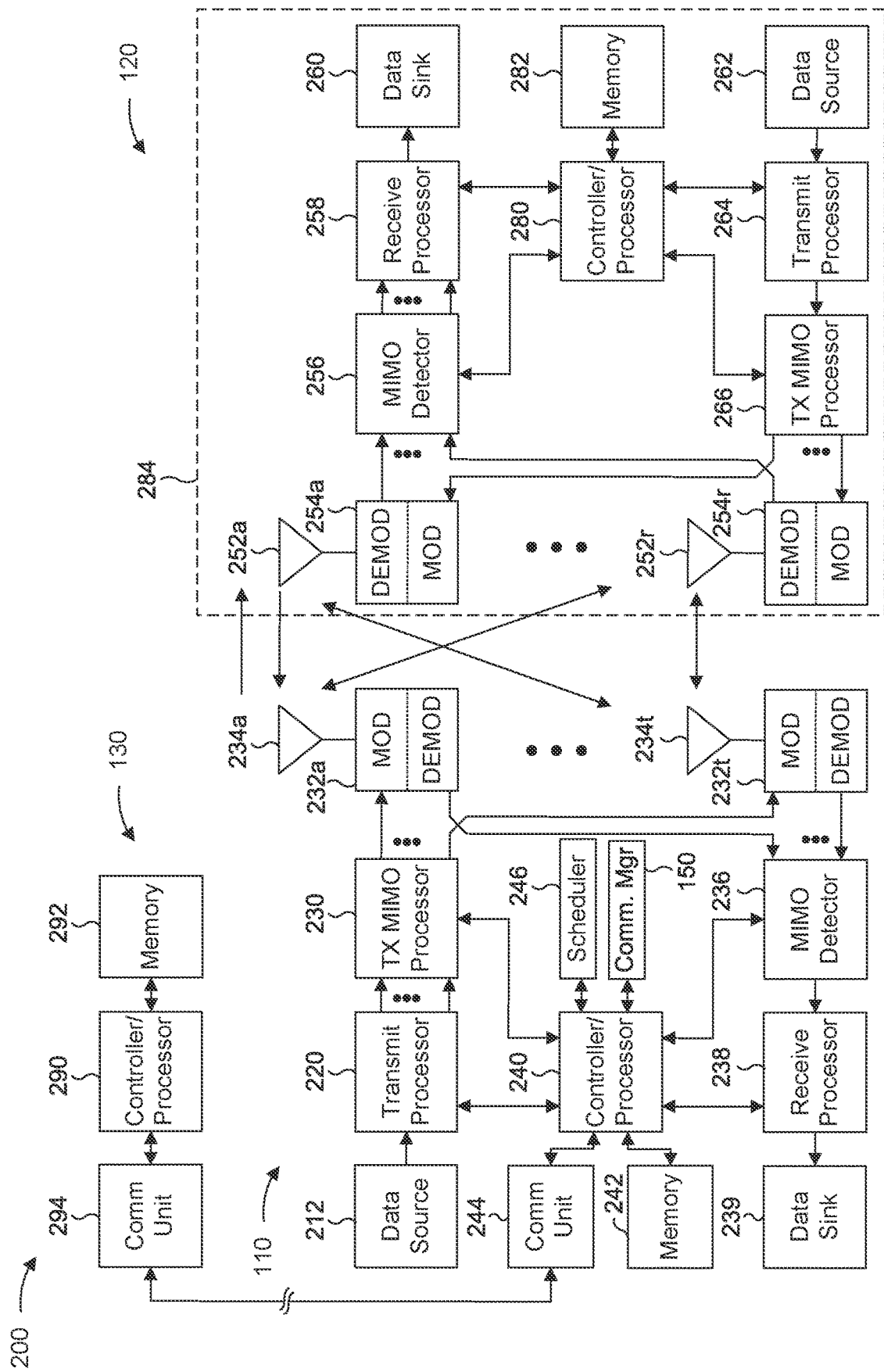
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-8).

The controller/processor 240 of the network node 110, the controller/processor 280 of the UE 120, and/or any other component(s) of FIG. 2 may perform one or more techniques associated with delay status and/or delay statistics reporting to maintain continuity during handover, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7 and/or other processes as described herein. In some examples, executing instructions may include running the instructions, converting the instructions, compiling the instructions, and/or interpreting the instructions, among other examples.

In some aspects, the network node 110 may include means for receiving, from a source network node 110, delay status information associated with a UE 120 served by the source network node 110, wherein the delay status information is associated with one or more LCHs; means for receiving, from the UE 120 during a RACH procedure, one or more messages that include one or more delay status reports associated with the one or more LCHs; and/or means for transmitting, to the UE 120 during a handover of the UE 120 from the source network node, one or more messages indicating one or more uplink scheduling parameters for the one or more LCHs based on the delay status information and the one or more delay status reports associated with the one or more LCHs. In some aspects, such means may include one or more components of network node 110 described in connection with FIG. 2, such as antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
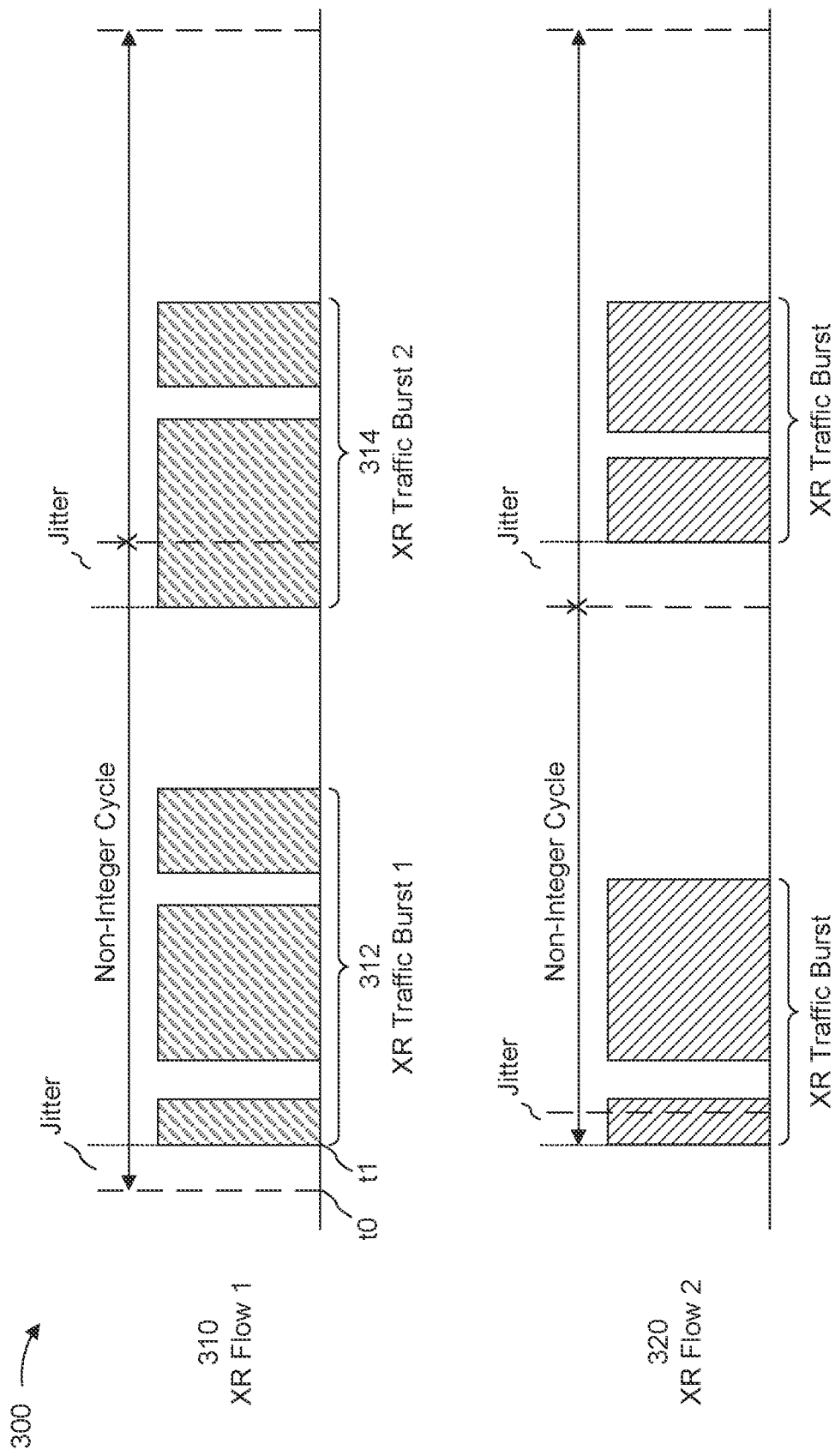
FIG. 3 is a diagram illustrating an example of extended reality (XR) traffic, in accordance with the present disclosure.

FIG. 3 is a diagram illustrating examples 300 of XR traffic, in accordance with the present disclosure. As described herein, XR traffic may generally refer to wireless communications for technologies such as VR, MR, and/or AR. VR may refer to technologies in which a user is immersed in a simulated experience that is similar or different from the real world. A user may interact with a VR system through a VR headset or a multi-projected environment that generates realistic images, sounds, and other sensations that simulate physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may include downlink traffic that is transmitted by a network node and received by a UE and/or uplink traffic that may be transmitted by a UE and received by a network node.

XR traffic may arrive in periodic traffic bursts ("XR traffic bursts"). For example, XR traffic may include pose, video, and/or other data transmitted by and/or to an XR-enabled UE, may have a varying video frame size over time, and/or may have quasi-periodic packet arrival times with application jitter (e.g., variations in delays and/or arrival times for XR traffic). Furthermore, traffic arrival time at a network node (e.g., a RAN node) is periodic with non-negligible jitter due to uncertain application processing times. Video frame sizes are an order of magnitude larger than packets in voice or industrial control communications, in addition to not being fixed over time. Rather, segmentation of each frame is expected, which implies that packets arrive in bursts that must be handled together to meet stringent bounded latency requirements. XR traffic bursts may vary with respect to the number of packets per traffic burst and/or with respect to a size of each packet in a traffic burst.

For example, FIG. 3 illustrates a first XR flow 310 that includes a first XR traffic burst 312 and a second XR traffic burst 314. As shown in FIG. 3, the XR traffic bursts may include different numbers of packets (e.g., the first XR traffic burst 312 is shown with three packets, represented as rectangles, and the second XR traffic burst 314 is shown with two packets). Furthermore, as illustrated in FIG. 3, the three packets in the first XR traffic burst 312 and the two packets in the second XR traffic burst 314 may vary in size. For example, packets within the first XR traffic burst 312 and packets within the second XR traffic burst 314 may include varying amounts of data.

XR traffic bursts may arrive at non-integer periods (e.g., in a non-integer cycle). The periods may be different than an integer number of symbols, slots, or other transmission time intervals (TTIs). In an example, for 60 frames per second (FPS) video data, XR traffic bursts may arrive in 1/60=16.67 ms periods. In another example, for 120 FPS video data, XR traffic bursts may arrive in 1/120=8.33 ms periods. Arrival times of XR traffic may vary. For example, XR traffic bursts may arrive at a transmitter (e.g., a UE or a network node) and become available for transmission at a time that is earlier or later than a time at which the transmitter expects the XR traffic bursts. As described herein, the variability of the packet arrival relative to the period (e.g., 16.76 ms period, 8.33 ms period, or the like) may be referred to as jitter. In an example, jitter for XR traffic may range from −4 ms (e.g., an earlier than expected arrival) to +4 ms (e.g., a later than expected arrival). For instance, referring to the first XR flow 310, a transmitter may expect a first packet of the first XR traffic burst 312 to arrive at time t0, but the first packet of the first XR traffic burst 312 actually arrives at time t1.

XR traffic may include multiple flows that arrive at a transmitter concurrently with one another (or within a threshold period of time). For instance, the second XR flow 320 shown in FIG. 3 may have different characteristics than the first XR flow 310. For instance, the second XR flow 320 may have XR traffic bursts with different numbers of packets, different sizes of packets, or other characteristics that vary from the first XR flow 310. In an example, the first XR flow 310 may include video data associated with an XR application and the second XR flow 320 may include audio data that corresponds to the video data associated with the XR application. In another example, the first XR flow 310 may include intra-coded picture frames (I-frames) that include complete images, and the second XR flow 320 may include predicted picture frames (P-frames) that include changes from a previous image.

XR traffic may have an associated packet delay budget (PDB). If a packet does not arrive within the PDB, a transmitter may discard the packet. In an example, if a packet corresponding to a video frame of a video does not arrive at a transmitter within a PDB, the transmitter may discard the packet, as the video has advanced beyond the frame. In general, XR traffic may be characterized by relatively high data rates and low latency. The latency in XR traffic may affect a user experience (e.g., a QoE). For instance, XR traffic may have applications in enhanced mobile broadband (cMBB) and ultra-reliable low-latency communication (URLLC) services. Some wireless communication systems may employ dynamic grants for scheduling purposes to accommodate delay-sensitive traffic (e.g., XR traffic). In a dynamic grant, a scheduler (e.g., a network node) may use control signaling to allocate resources for transmission or reception at a UE (e.g., a grant of uplink or downlink resources). Dynamic grants may be flexible and can adapt to variations in traffic behavior (e.g., based on delay status reporting and/or statistical delay reporting provided by a UE).

As indicated above, FIG. 3 is provided as an example. Other examples may differ from what is described with regard to FIG. 3.

Figure 4:
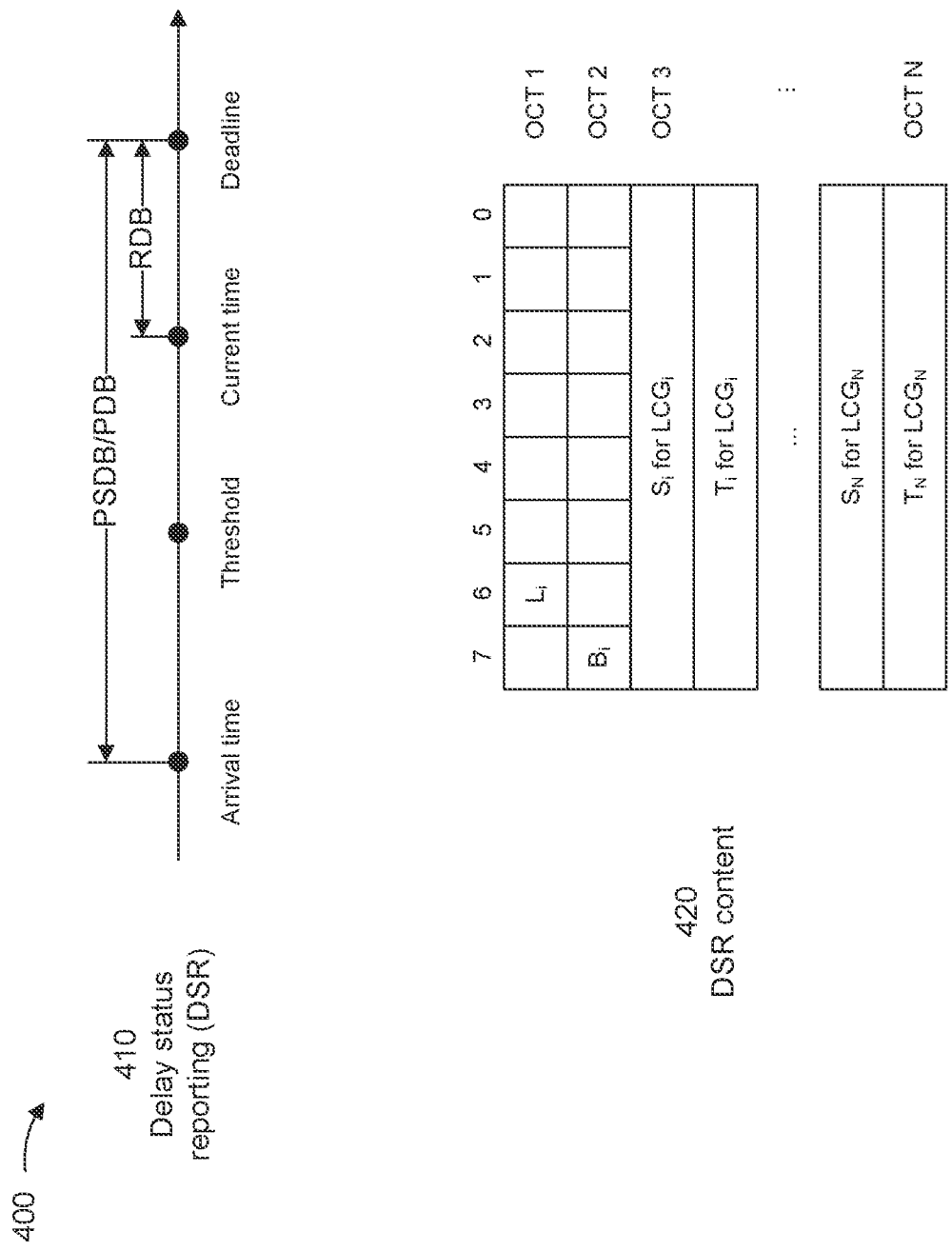
FIG. 4 is a diagram illustrating examples of delay status reporting and delay statistics reporting, in accordance with the present disclosure.

FIG. 4 is a diagram illustrating examples 400 of delay status reporting and delay statistics reporting, in accordance with the present disclosure. More particularly, as described herein, delay status reporting and/or delay statistics reporting (sometimes referred to as statistical delay reporting) may be useful to schedule delay-sensitive traffic, such as XR traffic, more efficiently than using a PDU set delay budget (PSDB) or a PDB. For example, as shown by reference number 410 in FIG. 4, a delay budget (e.g., a PSDB or PDB) generally starts when a PDU or a PDU set arrives in an uplink buffer associated with a UE, rather than when a network node is informed about the existence of a PDU from a buffer status report (BSR) that the UE transmits to indicate how much uplink data is in the uplink buffer. Accordingly, the PSDB/PDB may be insufficient to schedule XR or other delay-sensitive traffic efficiently, because the network node is unable to know the remaining delay budget (RDB) for buffered uplink data (e.g., because the BSR does not indicate how much data is buffered for how long). As a result, the network node is unable to determine when the delay budget associated with a buffered PDU will deplete, whereby a PSDB/PDB alone cannot adequately enable enhanced scheduling for delay-sensitive traffic. Accordingly, because the RDB (rather than the PSDB/PDB) indicates how soon a network node needs to provide uplink grants, the network node may configure a UE to dynamically report an RDB associated with a PDU stored in a Layer 2 (L2) buffer associated with the UE, where the RDB may be defined as a difference between a PDB or PSDB of a QoS flow associated with the PDU and the time that has elapsed since the PDU was received at a service data adaptation protocol (SDAP) layer. In this way, the network node may know the RDB for buffered uplink data and issue uplink grants before the deadline associated with the buffered uplink data.

In some aspects, as described herein, one or more triggers may be defined (e.g., in a wireless communication standard) and/or configured (e.g., by the network node) to define when a UE is to transmit a delay status report (DSR) to the network node. For example, in some aspects, the network node may generally configure one or more logical channel groups (LCGs) for which the UE is to provide a DSR, where each LCG may include one or more LCHs. For example, the UE may be configured with multiple LCHs, and may have data associated with one or more LCHs available for transmission at a time when the UE has an allocation of uplink resources. The UE may use an LCH prioritization configuration (LCP) procedure that controls how uplink shared channel resources are shared among the LCHs. In general, transmission of a DSR may be event-triggered or timer-triggered, which may be configured per LCG. For example, in an event-triggered DSR, the network node may configure a reporting threshold related to an RDB for an associated LCG, and a DSR may be triggered (e.g., the UE may transmit a DSR for the associated LCG) based on a minimum RDB among all PDUs in the associated LCG failing to satisfy (e.g., failing to equal or exceed) the reporting threshold. Additionally, or alternatively, in a timer-triggered DSR, the network node may configure a periodic DSR timer for an LCG, and a DSR may be triggered based on the periodic DSR timer expiring. In general, a triggered DSR (e.g., an event-triggered or timer-triggered DSR) may remain pending until an associated DSR medium access control (MAC) control element (MAC-CE) is included in a physical uplink shared channel (PUSCH) transmission, and a pending DSR may trigger a scheduling request until the pending DSR has been cancelled.

For example, as further shown in FIG. 4, reference number 420 depicts an example format for the content of a DSR MAC-CE. For example, the DSR MAC-CE may include one or more octets providing a bitmap to indicate which LCGs the UE is reporting in the DSR MAC-CE, where each LCG is associated with a first octet that indicates an amount of data in the reported LCG at a sampling instance, $S_i$, which may encoded using legacy or new BSR tables, and a duration between the sampling instance and a transmission time of the DSR in a PUSCH, $T_i$, which may be indicated in a unit of slots (e.g., with a maximum of 32 ms×8 slots/ms). In some aspects, the sampling instance may correspond to a slot in which the DSR was triggered or a slot in which the MAC PDU containing the DSR is assembled.

Additionally, or alternatively, a network node may configure a UE to measure and report downlink and/or uplink delay statistics for one or more DRBs that are used to transport the delay-sensitive traffic. For example, in some cases (e.g., where a traffic flow has a varying frame rate), a UE may be unable to signal nominal arrival times and delivery deadlines for each PDU or PDU set. In such cases, the network node has to schedule the one or more DRBs using a fixed delay budget, which can result in conservative deadlines. Accordingly, in some aspects, the network node may configure the UE to provide feedback on delay statistics (e.g., an average delay, a standard deviation, or the like) such that the network node can adapt the delay budgets that are configured and/or applied to compensate for scheduling inefficiencies. For example, on a downlink, the UE can be configured to measure the amount of delay budget that is remaining before a delivery deadline (e.g., a residual delay budget) for a PDU or a PDU set and to report the residual delay budget to the network node. The network node can then use the residual delay budget reported by the UE to adjust the delay budget that the network node applies to downlink traffic (e.g., the network node may increase the delay budget applied to downlink traffic if the residual delay budget is large). Additionally, or alternatively, on an uplink, the UE can be configured to measure and report the amount of delay that a PDU or a PDU set experienced when successfully received by the network node (e.g., upon reception of a positive RLC status report). The network node can then use the reported delay statistics to estimate the residual delay budget for the rest of the connection (e.g., by subtracting the delay reported by the UE from an end-to-end delay budget that is provisioned for a flow).

In some aspects, in cases where the UE is configured to report statistical delay information, the UE may generally report first order statistics and/or second order statistics for delays associated with one or more MAC PDUs from LCHs that are configured for statistical delay reporting. In some aspects, the delay statistics may be measured for both downlink and uplink traffic. For example, on the downlink, the delay statistics may include a delay from a first time when a physical downlink control channel (PDCCH) for a transport block is received to a second time when data associated with the transport block is delivered to an application. Additionally, or alternatively, on the uplink, the delay statistics may indicate a maximum delay from a first time when data is generated by an application to a second time when a transport block is transmitted in a PUSCH. In addition, the UE may measure a residual delay budget on the downlink, which refers to the time difference between the end of a delay budget configured by the network node and a delivery deadline that is required by an application. For example, in some aspects, the downlink and/or uplink delay statistics may include a mean, a variance, a standard deviation, and/or other statistics related to the delay measured on downlink and/or uplink traffic over a configured averaging window. Furthermore, in some aspects, the delay statistics may include buffer information. The delay statistics may be transmitted by a UE in a MAC-CE when the UE has a PUSCH resource available for transmission of the delay statistics. In some aspects, the delay statistics may include a statistical delay for multiple LCHs that are configured for delay status reporting, and a trigger for transmission of the delay statistics can be based on statistical thresholds compared to one or more statistical parameters having smallest values or a smallest RDB.

As indicated above, FIG. 4 is provided as an example. Other examples may differ from what is described with regard to FIG. 4.

Figure 5:
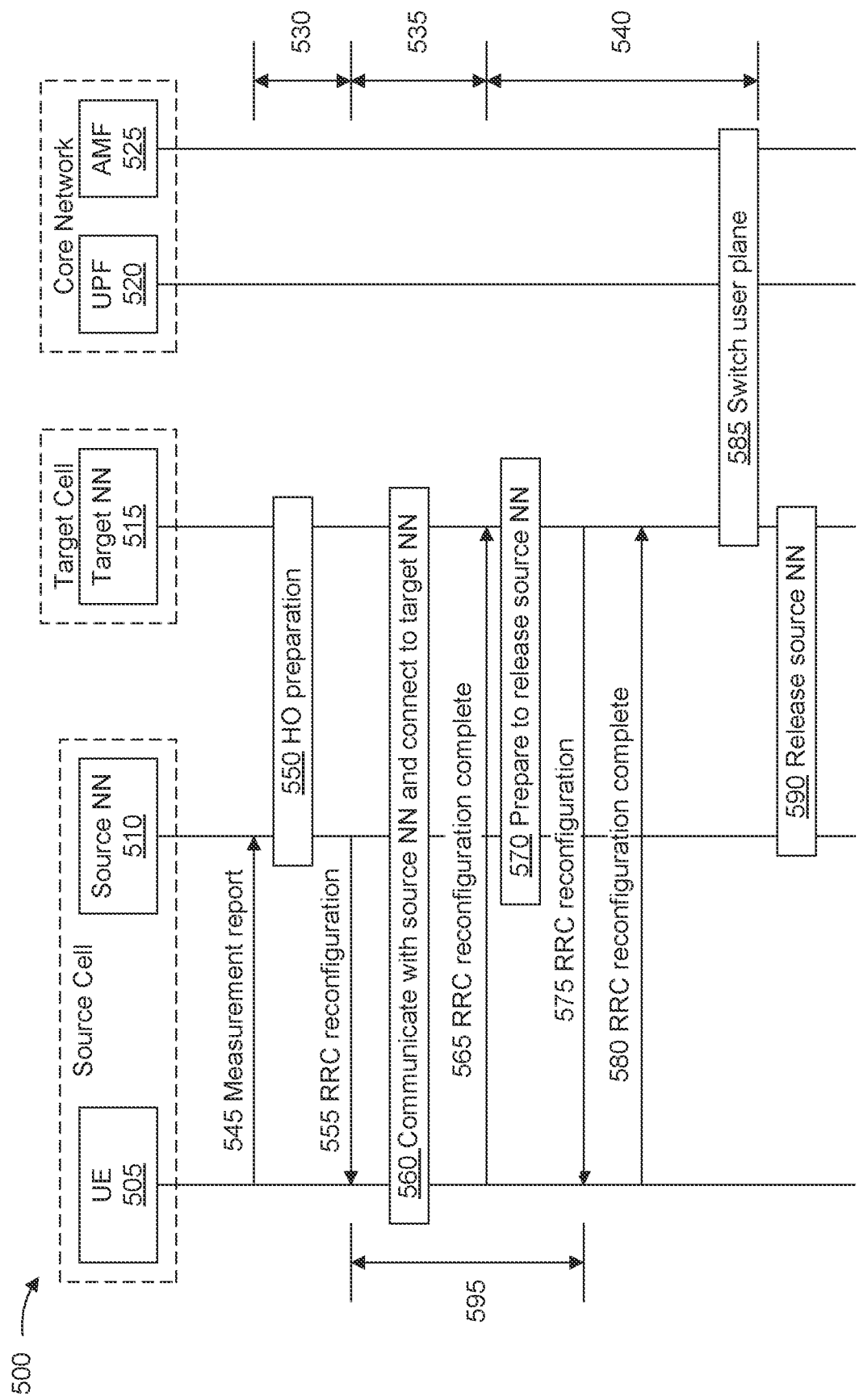
FIG. 5 is a diagram illustrating an example of a make-before-break handover procedure, in accordance with the present disclosure.

FIG. 5 is a diagram illustrating an example 500 of a make-before-break (MBB) handover procedure, in accordance with the present disclosure. In some aspects, an MBB handover procedure may be referred to as a DAPS handover procedure.

As shown in FIG. 5, the MBB handover procedure may involve a UE 505, a source network node 510, a target network node 515, a user plane function (UPF) device 520, and an access and mobility management function (AMF) device 525. In some examples, actions described as being performed by a network node may be performed by multiple different network nodes. For example, configuration actions and/or core network communication actions may be performed by a first network node (e.g., a CU or a DU), and radio communication actions may be performed by a second network node (e.g., a DU or an RU). The UE 505 may correspond to the UE 120 described elsewhere herein. The source network node 510 and/or the target network node 515 may correspond to the network node 110 described elsewhere herein. The UPF device 520 and/or the AMF device 525 may correspond to the network controller 130 described elsewhere herein. The UE 505 and the source network node 510 may be connected (e.g., may have a radio resource control (RRC) connection) via a serving cell or a source cell, and the UE 505 may undergo a handover to the target network node 515 via a target cell. The UPF device 520 and/or the AMF device 525 may be located within a core network. The source network node 510 and the target network node 515 may be in communication with the core network for mobility support and user plane functions. The MBB handover procedure may include an eMBB handover procedure.

As shown, the MBB handover procedure may include a handover preparation phase 530, a handover execution phase 535, and a handover completion phase 540. During the handover preparation phase 530, the UE 505 may report measurements that cause the source network node 510 and/or the target network node 515 to prepare for handover and trigger execution of the handover. During the handover execution phase 535, the UE 505 may execute the handover by performing a RACH procedure with the target network node 515 and establishing an RRC connection with the target network node 515 (e.g., the UE 505 may detach from the source cell and synchronize to the target cell). During the handover completion phase 540, the source network node 510 may forward one or more stored (e.g., buffered) communications associated with the UE 505 to the target network node 515, and the UE 505 may be released from a connection with the source network node 510.

As shown by reference number 545, the UE 505 may perform one or more measurements, and may transmit a measurement report to the source network node 510 based at least in part on performing the one or more measurements (e.g., serving cell measurements and/or neighbor cell measurements). The measurement report may indicate, for example, an RSRP parameter, an RSRQ parameter, an RSSI parameter, and/or a signal-to-interference-plus-noise-ratio (SINR) parameter (e.g., for the serving cell and/or one or more neighbor cells). The source network node 510 may use the measurement report to determine whether to trigger a handover to the target network node 515. For example, if one or more measurements satisfy a condition, then the source network node 510 may trigger a handover of the UE 505 to the target network node 515.

As shown by reference number 550, the source network node 510 and the target network node 515 may communicate with one another to prepare for a handover of the UE 505. As part of the handover preparation, the source network node 510 may transmit a handover request to the target network node 515 to instruct the target network node 515 to prepare for the handover. The source network node 510 may communicate RRC context information associated with the UE 505 and/or configuration information associated with the UE 505 to the target network node 515. The target network node 515 may prepare for the handover by performing admission control and reserving resources for the UE 505. After reserving the resources, the target network node 515 may transmit an acknowledgement (ACK) to the source network node 510 in response to the handover request.

As shown by reference number 555, the source network node 510 may transmit an RRC reconfiguration message to the UE 505. The RRC reconfiguration message may include a handover command instructing the UE 505 to execute a handover procedure from the source network node 510 to the target network node 515. The handover command may include information associated with the target network node 515, such as a RACH preamble assignment for accessing the target network node 515. Reception of the RRC reconfiguration message, including the handover command, by the UE 505 may trigger the start of the handover execution phase 535.

As shown by reference number 560, during the handover execution phase 535 of the MBB handover, the UE 505 may execute the handover by performing a RACH procedure with the target network node 515 (e.g., including synchronization with the target network node 515) while continuing to communicate with the source network node 510. For example, while the UE 505 is performing the RACH procedure with the target network node 515, the UE 505 may transmit uplink data, uplink control information, and/or an uplink reference signal (e.g., a sounding reference signal) to the source network node 510, and/or may receive downlink data, downlink control information, and/or a downlink reference signal from the source network node 510.

As shown by reference number 565, upon successfully establishing a connection with the target network node 515 (e.g., via a RACH procedure), the UE 505 may transmit an RRC reconfiguration completion message to the target network node 515. Reception of the RRC reconfiguration message by the target network node 515 may trigger the start of the handover completion phase 540.

As shown by reference number 570, the source network node 510 and the target network node 515 may communicate with one another to prepare for release of the connection between the source network node 510 and the UE 505. In some aspects, the target network node 515 may determine that a connection between the source network node 510 and the UE 505 is to be released, such as after receiving the RRC reconfiguration message from the UE 505. In this case, the target network node 515 may transmit a handover connection setup completion message to the source network node 510. The handover connection setup completion message may cause the source network node 510 to stop transmitting data to the UE 505 and/or to stop receiving data from the UE 505. Additionally, or alternatively, the handover connection setup completion message may cause the source network node 510 to forward communications associated with the UE 505 to the target network node 515 and/or to notify the target network node 515 of a status of one or more communications with the UE 505. For example, the source network node 510 may forward, to the target network node 515, buffered downlink communications (e.g., downlink data) for the UE 505 and/or uplink communications (e.g., uplink data) received from the UE 505. Additionally, or alternatively, the source network node 510 may notify the target network node 515 regarding a packet data convergence protocol (PDCP) status associated with the UE 505 and/or a sequence number to be used for a downlink communication with the UE 505.

As shown by reference number 575, the target network node 515 may transmit an RRC reconfiguration message to the UE 505 to instruct the UE 505 to release the connection with the source network node 510. Upon receiving the instruction to release the connection with the source network node 510, the UE 505 may stop communicating with the source network node 510. For example, the UE 505 may refrain from transmitting uplink communications to the source network node 510 and/or may refrain from monitoring for downlink communications from the source network node 510.

As shown by reference number 580, the UE may transmit an RRC reconfiguration completion message to the target network node 515 to indicate that the connection between the source network node 510 and the UE 505 is being released or has been released.

As shown by reference number 585, the target network node 515, the UPF device 520, and/or the AMF device 525 may communicate to switch a user plane path of the UE 505 from the source network node 510 to the target network node 515. Prior to switching the user plane path, downlink communications for the UE 505 may be routed through the core network to the source network node 510. After the user plane path is switched, downlink communications for the UE 505 may be routed through the core network to the target network node 515. Upon completing the switch of the user plane path, the AMF device 525 may transmit an end marker message to the source network node 510 to signal completion of the user plane path switch. As shown by reference number 590, the target network node 515 and the source network node 510 may communicate to release a context associated with the UE 505 at the source network node 510.

As part of the MBB handover procedure, the UE 505 may maintain simultaneous connections with the source network node 510 and the target network node 515 during a time period 595. The time period 595 may start at the beginning of the handover execution phase 535 (e.g., upon reception by the UE 505 of a handover command from the source network node 510) when the UE 505 performs a RACH procedure with the target network node 515. The time period 595 may end upon release of the connection between the UE 505 and the source network node 510 (e.g., upon reception by the UE 505 of an instruction, from the target network node 515, to release the source network node 510). By maintaining simultaneous connections with the source network node 510 and the target network node 515, the handover procedure can be performed with zero or a minimal interruption to communications, thereby reducing latency.

However, when a UE changes cells, such as moving from the source cell provided by the source network node 510 to the target cell provided by the target network node 515, the source network node 510 typically ceases any uplink and/or downlink transmission for the UE 505 after the source network node 510 sends an SN status transfer message to the target network node 515. In a typical handover procedure, the target network node 515 does not have access to any information that indicates the delay status or delay statistics that the UE 505 is experiencing. Consequently, the target network node 515 needs to defer uplink scheduling until after the handover is complete, which increases the delay associated with uplink traffic, which is particularly troublesome for XR services or other traffic associated with delay-sensitive applications and/or a tight delay budget. Accordingly, some aspects described herein relate to techniques to inform a target network node about the delay status or delay statistics experienced by a UE (e.g., UE 505) being handed over to a target network node (e.g., target network node 515) such that the target network node can start to determine uplink scheduling parameters (e.g., an uplink scheduling priority and/or an uplink grant size) for the UE based on the reported delay status or delay statistics.

For example, in some aspects, the source network node may provide delay status information associated with the UE to the target network node in the SN status transfer message or a separate message during a handover of the UE. Additionally, or alternatively, the UE may provide one or more delay status reports to the target network node in an uplink message associated with a RACH procedure. In this way, during a DAPS handover or an MBB handover, where an interruption time is close to zero (0) ms, informing the target network node of the delay status associated with the UE allows the target network node to schedule the UE as soon as possible to satisfy delay requirements for XR or other delay-sensitive traffic. Additionally, or alternatively, in a non-DAPS handover (e.g., where the latency requirements for XR or other delay-sensitive traffic is usually much smaller than the time required by the mobility procedure), the statistical delay reporting may provide long-term statistics that are useful for making scheduling decisions.

As indicated above, FIG. 5 is provided as an example. Other examples may differ from what is described with regard to FIG. 5.

Figure 6:
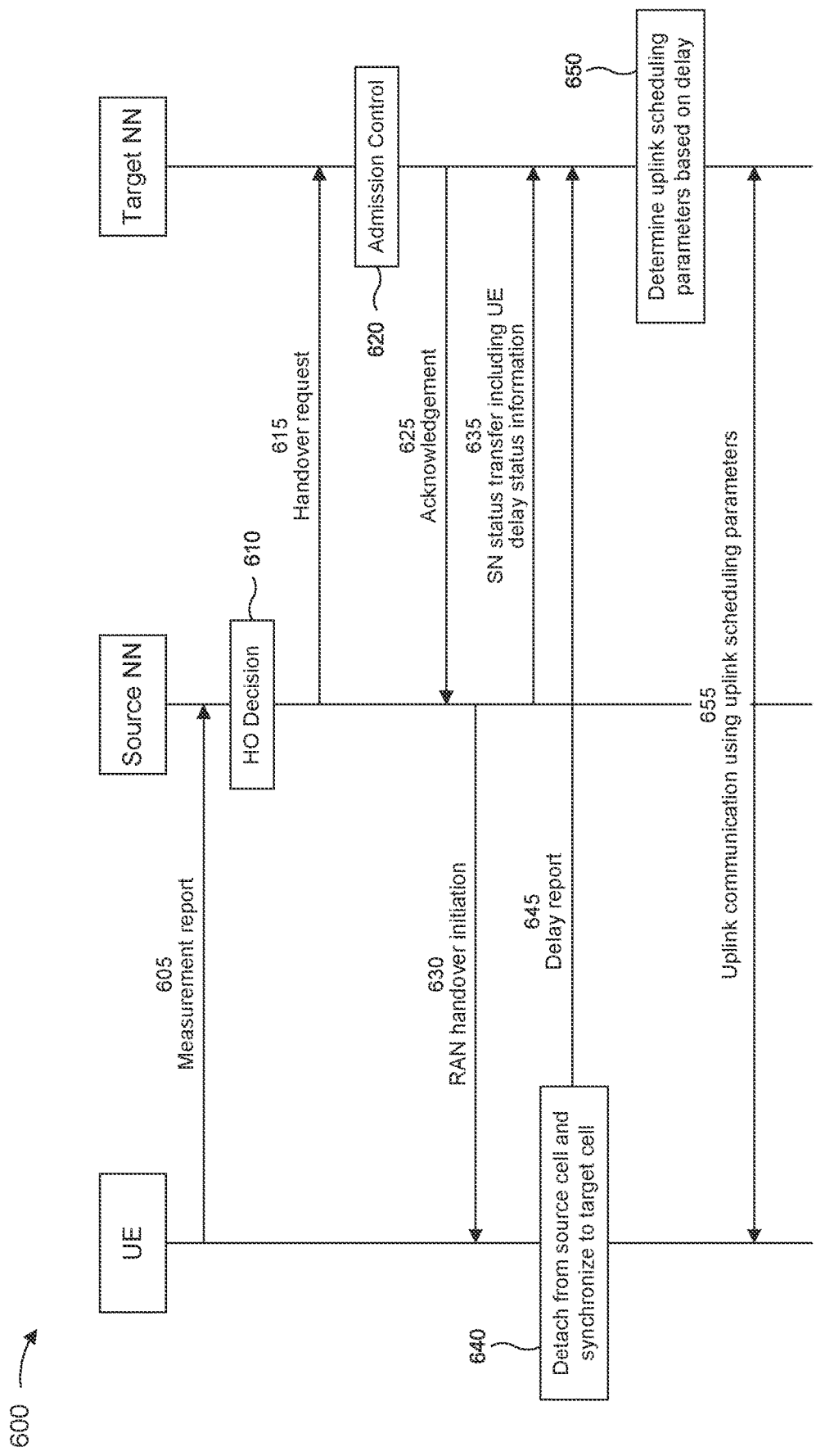
FIG. 6 is a diagram illustrating an example associated with delay status and/or delay statistics reporting to maintain continuity during handover, in accordance with the present disclosure.

FIG. 6 is a diagram illustrating an example 600 associated with delay status and/or delay statistics reporting to maintain continuity during handover, in accordance with the present disclosure. As shown in FIG. 6, example 600 includes communication between a UE, a source network node that provides a source cell, and a target network node that provides a target cell. In some aspects, the UE, the source network node, and the target network node may be included in a wireless network, such as wireless network 100. The UE, the source network node, and the target network node may communicate on wireless access links, which may include uplinks and downlinks. The source network node and the target network node may communicate with one or more devices in a core network (not shown) for mobility support and user plane functions.

As shown in FIG. 6, and by reference number 605, the UE may transmit, and the source network node may receive, a measurement report. In some aspects, the measurement report may include one or more measurements (e.g., serving cell measurements and/or neighbor cell measurements) performed by the UE. The measurement report may indicate, for example, an RSRP parameter, an RSRQ parameter, an RSSI parameter, and/or an SINR parameter (e.g., for the serving cell and/or one or more neighbor cells).

As further shown in FIG. 6, and by reference number 610, the source network node may determine whether a handover to the target network node is to be performed. In some aspects, the source network node may use the measurement report provided by the UE to determine whether to trigger the handover to the target network node. For example, if one or more measurements satisfy a condition, the source network node may trigger a handover of the UE to the target network node. As further shown in FIG. 6, and by reference number 615, when the source network node determines that the handover of the UE to the target network node is to be performed, the source network node sends a handover request including a context relocation request to the target network node. The handover request may include RRC context information associated with the UE and/or configuration information associated with the UE. As further shown in FIG. 6, and by reference number 620, the target network node may perform admission control based at least in the context relocation request(s) received from the source network node. The target network node may reserve resources for the UE to prepare for the handover. As further shown in FIG. 6, and by reference number 625, after reserving resources for the UE, the target network node may transmit an acknowledgement to the source network node in connection with the handover request. As further shown in FIG. 6, and by reference number 630, the source network node may transmit, and the UE may receive, a message initiating a handover to the target network node.

In some aspects, as shown in FIG. 6, and by reference number 635, the source network node may send an SN status transfer message to the target network node. The SN status transfer message may notify the target network node regarding a PDCP status associated with the UE and/or a sequence number to be used for a downlink communication with the UE. In some aspects, the SN status transfer message may include a statistical delay status and/or a delay status report associated with the UE. For example, in some aspects, the statistical delay status and/or delay status report may be reported to the target network node in the SN status transfer message such that the target network node can start to determine uplink scheduling parameters for the UE based on the delay statistics reported in the SN status transfer message. For example, in some aspects, the SN status transfer message may include a message type information element (IE), a source network node identifier (e.g., allocated for handover at the source network node and for dual connectivity at the network node from which a DRB context is transferred), a target network node identifier (e.g., allocated for handover at the target network node and for dual connectivity at the network node to which the DRB context is transferred), and a list of one or more DRBs that are subject to the SN status transfer message. In addition, in some aspects, the SN status transfer message may include a statistical delay reporting IE, which may include an octet string to define one or more statistical delays (e.g., mean, standard deviation, variance, or the like) associated with one or more logical channels. Furthermore, because a mapping between one or more LCHs and one or more LCGs may change during handover, the statistical delay reporting provided in the SN status transfer message may be indicated based on an LCG or LCH configuration in the source cell provided by the source network node. Furthermore, although some aspects are described herein in a context where the statistical delay information is provided in the SN status transfer message, the statistical delay information may be provided in a separate message that is provided from the source network node to the target network node during the handover procedure.

As further shown in FIG. 6, and by reference number 640, the UE may detach from the source cell provided by the source network node and may synchronize to the target cell provided by the target network node based on the handover initiation message provided by the source network node. In some aspects, the handover initiation message may trigger the UE to perform a RACH procedure with the target network node in the target cell. Furthermore, as shown by reference number 645, the UE may transmit a delay status report to the target network node in an uplink message associated with the RACH procedure. For example, in a four-step RACH procedure, the delay status report may be provided in message 1 or message 3 of the four-step RACH procedure, or in a PUSCH message that uses an uplink grant provided by the target network node after the UE is in an RRC connected state with the target network node. Additionally, or alternatively, in a two-step RACH procedure, the delay status report may be provided in a message A preamble or message A PUSCH, or in a PUSCH message that uses an uplink grant provided by the target network node. In some aspects, the delay status report may be implicitly triggered (e.g., indicating that the UE can transmit the delay status report for one or more LCHs in an uplink message associated with a RACH procedure, such as msg1 or msg3 in a four-step RACH procedure or msgA in a two-step RACH procedure, or after transmission of a downlink message, such as msg4 in a four-step RACH procedure or msgB in a two-step RACH procedure). Additionally, or alternatively, transmission of the delay status report by the UE may be an explicitly triggered (e.g., by the target network node during the RACH procedure, such as by one or more parameters of a random access response message). In some aspects, the delay status report provided by the UE may be a standalone DSR, or the delay status report may be included in a BSR MAC-CE that is extended to indicate delays experienced by one or more LCHs.

In some aspects, as shown by reference number 650, the target network node may determine one or more uplink scheduling parameters for the UE based on the delay information provided by the source network node and/or the UE. For example, as described herein, the delay information provided by the source network node may include a delay status report and/or statistical delay information associated with the UE, which the UE may have previously reported to the source network node. Additionally, or alternatively, the delay information provided by the UE may include the delay status report and/or the statistical delay information associated with the UE. Furthermore, in either or both cases, the delay information provided to the target network node may include a BSR corresponding to the one or more LCGs or LCHs associated with the delay information provided to the target network node. Accordingly, the target network node may determine one or more uplink scheduling parameters for the UE, such as an uplink grant size and/or an uplink scheduling priority, based on the delay information reported by the source network node and/or the UE. In some aspects, as shown by reference number 655, the target network node and the UE may then engage in uplink communication using the uplink scheduling parameters that are determined based on the delay information reported by the source network node and/or the UE. For example, in some aspects, the target network node may transmit information indicating the one or more scheduling parameters to the UE, and the UE may use the scheduling parameters to transmit uplink data that is buffered for transmission at the UE.

As indicated above, FIG. 6 is provided as an example. Other examples may differ from what is described with regard to FIG. 6.

Figure 7:
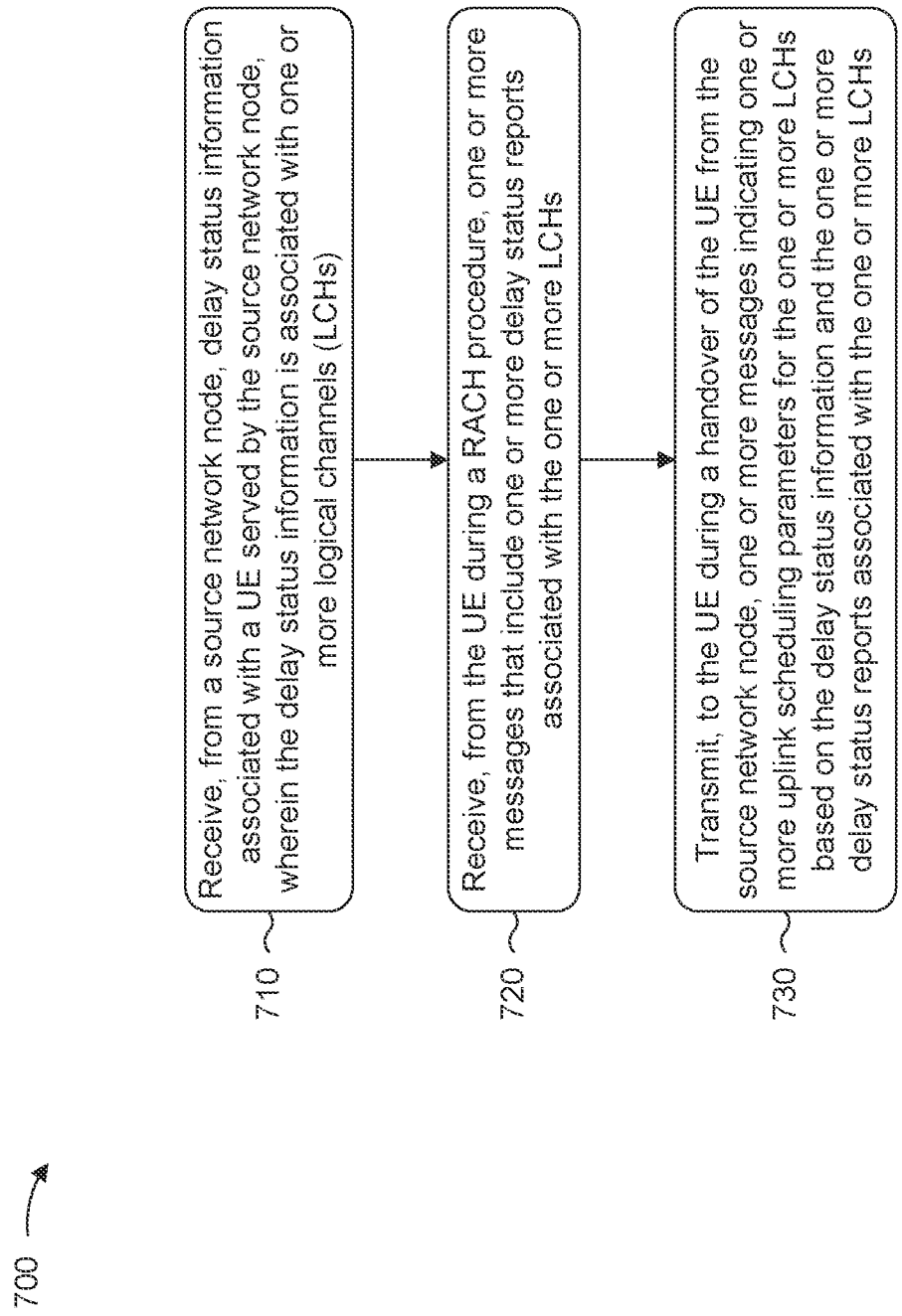
FIG. 7 is a diagram illustrating an example process associated with delay status and/or delay statistics reporting to maintain continuity during handover, in accordance with the present disclosure.

FIG. 7 is a diagram illustrating an example process 700 performed, for example, by a target network node, in accordance with the present disclosure. Example process 700 is an example where the target network node (e.g., target network node 110) performs operations associated with delay status and/or delay statistics reporting to maintain continuity during handover.

As shown in FIG. 7, in some aspects, process 700 may include receiving, from a source network node, delay status information associated with a UE served by the source network node, wherein the delay status information is associated with one or more LCHs (block 710). For example, the target network node (e.g., using reception component 802 and/or communication manager 806, depicted in FIG. 9) may receive, from a source network node, delay status information associated with a UE served by the source network node, wherein the delay status information is associated with one or more LCHs, as described above.

As further shown in FIG. 7, in some aspects, process 700 may include receiving, from the UE during a RACH procedure, one or more messages that include one or more delay status reports associated with the one or more LCHs (block 720). For example, the target network node (e.g., using reception component 802 and/or communication manager 806, depicted in FIG. 9) may receive, from the UE during a RACH procedure, one or more messages that include one or more delay status reports associated with the one or more LCHs, as described above.

As further shown in FIG. 7, in some aspects, process 700 may include transmitting, to the UE during a handover of the UE from the source network node, one or more messages indicating one or more uplink scheduling parameters for the one or more LCHs based on the delay status information and the one or more delay status reports associated with the one or more LCHs (block 730). For example, the target network node (e.g., using transmission component 804 and/or communication manager 806, depicted in FIG. 9) may transmit, to the UE during a handover of the UE from the source network node, one or more messages indicating one or more uplink scheduling parameters for the one or more LCHs based on the delay status information and the one or more delay status reports associated with the one or more LCHs, as described above.

Process 700 may include additional aspects, such as any single aspect or any combination of aspects described below and/or in connection with one or more other processes described elsewhere herein.

In a first aspect, the one or more uplink scheduling parameters include an uplink scheduling priority.

In a second aspect, alone or in combination with the first aspect, the one or more uplink scheduling parameters include an uplink grant size.

In a third aspect, alone or in combination with one or more of the first and second aspects, the delay status information is indicated in an information element of a message received from the source network node during the handover of the UE from the source network node.

In a fourth aspect, alone or in combination with one or more of the first through third aspects, the message indicating the delay status information is an SN status transfer message received from the source network node.

In a fifth aspect, alone or in combination with one or more of the first through fourth aspects, the message indicates the delay status information according to LCH configurations or LCG configurations for the one or more LCHs in a source cell provided by the source network node.

In a sixth aspect, alone or in combination with one or more of the first through fifth aspects, the delay status information includes a delay status report associated with the one or more LCHs.

In a seventh aspect, alone or in combination with one or more of the first through sixth aspects, the delay status information includes a statistical delay report associated with the one or more LCHs.

In an eighth aspect, alone or in combination with one or more of the first through seventh aspects, the delay status information includes a BSR associated with the one or more LCHs.

In a ninth aspect, alone or in combination with one or more of the first through eighth aspects, the one or more messages that include the one or more delay status reports include message 1 of the RACH procedure, message 3 of the RACH procedure, or an uplink transmission associated with an uplink grant.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
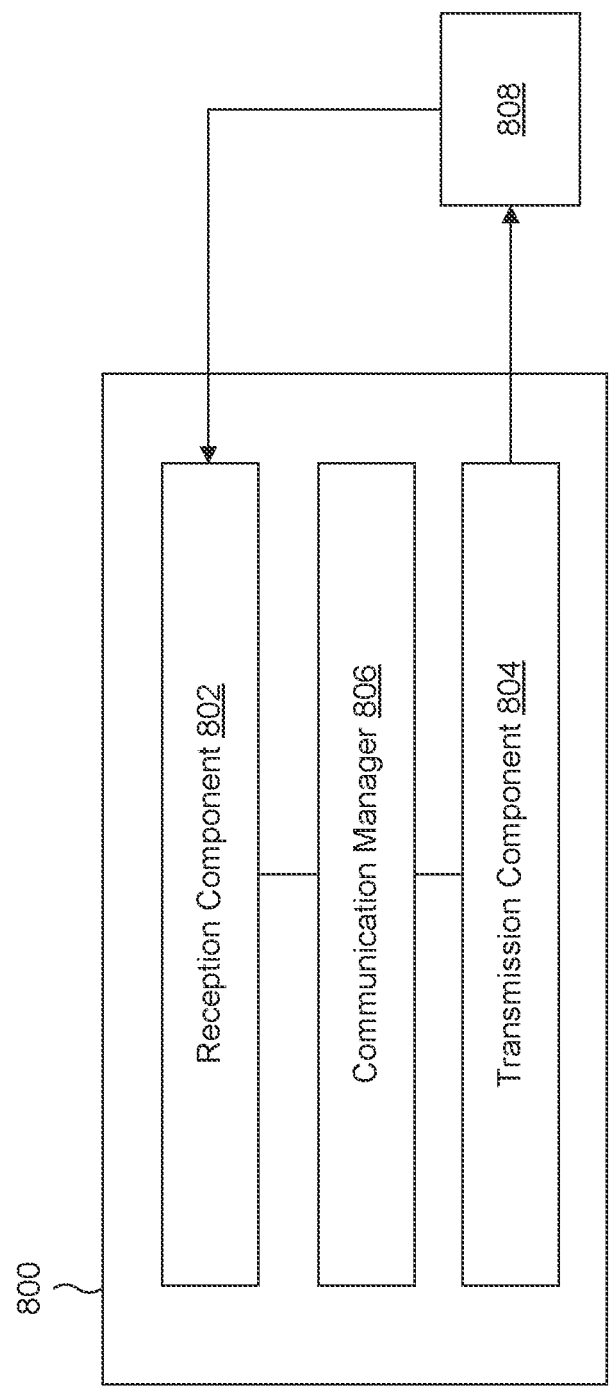
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a target network node, or a target network node may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 150 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7 or a combination thereof. In some aspects, the apparatus 800 and/or one or more components shown in FIG. 8 may include one or more components of the target butt described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the target butt described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the target butt described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

In some aspects, the reception component 802 may receive, from a source network node, delay status information associated with a UE served by the source network node, wherein the delay status information is associated with one or more LCHs. The reception component 802 may receive, from the UE during a RACH procedure, one or more messages that include one or more delay status reports associated with the one or more LCHs. The transmission component 804 may transmit, to the UE during a handover of the UE from the source network node, one or more messages indicating one or more uplink scheduling parameters for the one or more LCHs based on the delay status information and the one or more delay status reports associated with the one or more LCHs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a target network node, comprising: receiving, from a source network node, delay status information associated with a UE served by the source network node, wherein the delay status information is associated with one or more LCHs; receiving, from the UE during a RACH procedure, one or more messages that include one or more delay status reports associated with the one or more LCHs; and transmitting, to the UE during a handover of the UE from the source network node, one or more messages indicating one or more uplink scheduling parameters for the one or more LCHs based on the delay status information and the one or more delay status reports associated with the one or more LCHs.

Aspect 2: The method of Aspect 1, wherein the one or more uplink scheduling parameters include an uplink scheduling priority.

Aspect 3: The method of any of Aspects 1-2, wherein the one or more uplink scheduling parameters include an uplink grant size.

Aspect 4: The method of any of Aspects 1-3, wherein the delay status information is indicated in an information element of a message received from the source network node during the handover of the UE from the source network node.

Aspect 5: The method of Aspect 4, wherein the message indicating the delay status information is an SN status transfer message received from the source network node.

Aspect 6: The method of any of Aspects 4-5, wherein the message indicates the delay status information according to LCH configurations or LCG configurations for the one or more LCHs in a source cell provided by the source network node.

Aspect 7: The method of any of Aspects 1-6, wherein the delay status information includes a delay status report associated with the one or more LCHs.

Aspect 8: The method of any of Aspects 1-7, wherein the delay status information includes a statistical delay report associated with the one or more LCHs.

Aspect 9: The method of any of Aspects 1-8, wherein the delay status information includes a buffer status report associated with the one or more LCHs.

Aspect 10: The method of any of Aspects 1-9, wherein the one or more messages that include the one or more delay status reports include message 1 of the RACH procedure, message 3 of the RACH procedure, or an uplink transmission associated with an uplink grant.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A target network node for wireless communication, comprising:
  a memory; and
  one or more processors, coupled to the memory, configured to:
    receive, from a source network node, delay status information associated with a user equipment (UE) served by the source network node, wherein the delay status information is associated with one or more logical channels (LCHs);
    receive, from the UE during a random access channel (RACH) procedure, one or more messages that include one or more delay status reports associated with the one or more LCHs; and
    transmit, to the UE during a handover of the UE from the source network node, one or more messages indicating one or more uplink scheduling parameters for the one or more LCHs based on the delay status information and the one or more delay status reports associated with the one or more LCHs.

2. The target network node of claim 1, wherein the one or more uplink scheduling parameters include an uplink scheduling priority.

3. The target network node of claim 1, wherein the one or more uplink scheduling parameters include an uplink grant size.

4. The target network node of claim 1, wherein the delay status information is indicated in an information element of a message received from the source network node during the handover of the UE from the source network node.

5. The target network node of claim 4, wherein the message indicating the delay status information is a sequence number (SN) status transfer message received from the source network node.

6. The target network node of claim 4, wherein the message indicates the delay status information according to LCH configurations or LCH group (LCG) configurations for the one or more LCHs in a source cell provided by the source network node.

7. The target network node of claim 1, wherein the delay status information includes a delay status report associated with the one or more LCHs.

8. The target network node of claim 1, wherein the delay status information includes a statistical delay report associated with the one or more LCHs.

9. The target network node of claim 1, wherein the delay status information includes a buffer status report associated with the one or more LCHs.

10. The target network node of claim 1, wherein the one or more messages that include the one or more delay status reports include message 1 of the RACH procedure, message 3 of the RACH procedure, or an uplink transmission associated with an uplink grant.

11. A method of wireless communication performed by a target network node, comprising:
  receiving, from a source network node, delay status information associated with a user equipment (UE) served by the source network node, wherein the delay status information is associated with one or more logical channels (LCHs);
  receiving, from the UE during a random access channel (RACH) procedure, one or more messages that include one or more delay status reports associated with the one or more LCHs; and
  transmitting, to the UE during a handover of the UE from the source network node, one or more messages indicating one or more uplink scheduling parameters for the one or more LCHs based on the delay status information and the one or more delay status reports associated with the one or more LCHs.

12. The method of claim 11, wherein the one or more uplink scheduling parameters include an uplink scheduling priority.

13. The method of claim 11, wherein the one or more uplink scheduling parameters include an uplink grant size.

14. The method of claim 11, wherein the delay status information is indicated in an information element of a message received from the source network node during the handover of the UE from the source network node.

15. The method of claim 14, wherein the message indicating the delay status information is a sequence number (SN) status transfer message received from the source network node.

16. The method of claim 14, wherein the message indicates the delay status information according to LCH configurations or LCH group (LCG) configurations for the one or more LCHs in a source cell provided by the source network node.

17. The method of claim 11, wherein the delay status information includes a delay status report associated with the one or more LCHs.

18. The method of claim 11, wherein the delay status information includes a statistical delay report associated with the one or more LCHs.

19. The method of claim 11, wherein the delay status information includes a buffer status report associated with the one or more LCHs.

20. The method of claim 11, wherein the one or more messages that include the one or more delay status reports include message 1 of the RACH procedure, message 3 of the RACH procedure, or an uplink transmission associated with an uplink grant.

21. A non-transitory computer-readable medium storing a set of instructions for wireless communication, the set of instructions comprising:
one or more instructions that, when executed by one or more processors of a target network node, cause the target network node to:
receive, from a source network node, delay status information associated with a user equipment (UE) served by the source network node, wherein the delay status information is associated with one or more logical channels (LCHs);
receive, from the UE during a random access channel (RACH) procedure, one or more messages that include one or more delay status reports associated with the one or more LCHs; and
transmit, to the UE during a handover of the UE from the source network node, one or more messages indicating one or more uplink scheduling parameters for the one or more LCHs based on the delay status information and the one or more delay status reports associated with the one or more LCHs.

22. The non-transitory computer-readable medium of claim 21, wherein the one or more uplink scheduling parameters include an uplink scheduling priority.

23. The non-transitory computer-readable medium of claim 21, wherein the one or more uplink scheduling parameters include an uplink grant size.

24. The non-transitory computer-readable medium of claim 21, wherein the delay status information is indicated in an information element of a message received from the source network node during the handover of the UE from the source network node.

25. The non-transitory computer-readable medium of claim 21, wherein the delay status information includes one or more of a delay status report, a statistical delay report, or a buffer status report associated with the one or more LCHs.

26. An apparatus for wireless communication, comprising:
means for receiving, from a source network node, delay status information associated with a user equipment (UE) served by the source network node, wherein the delay status information is associated with one or more logical channels (LCHs);
means for receiving, from the UE during a random access channel (RACH) procedure, one or more messages that include one or more delay status reports associated with the one or more LCHs; and
means for transmitting, to the UE during a handover of the UE from the source network node, one or more messages indicating one or more uplink scheduling parameters for the one or more LCHs based on the delay status information and the one or more delay status reports associated with the one or more LCHs.

27. The apparatus of claim 26, wherein the one or more uplink scheduling parameters include an uplink scheduling priority.

28. The apparatus of claim 26, wherein the one or more uplink scheduling parameters include an uplink grant size.

29. The apparatus of claim 26, wherein the delay status information is indicated in an information element of a message received from the source network node during the handover of the UE from the source network node.

30. The apparatus of claim 26, wherein the delay status information includes one or more of a delay status report, a statistical delay report, or a buffer status report associated with the one or more LCHs.

* * * * *